United States Patent Office 3,321,991
Patented May 30, 1967

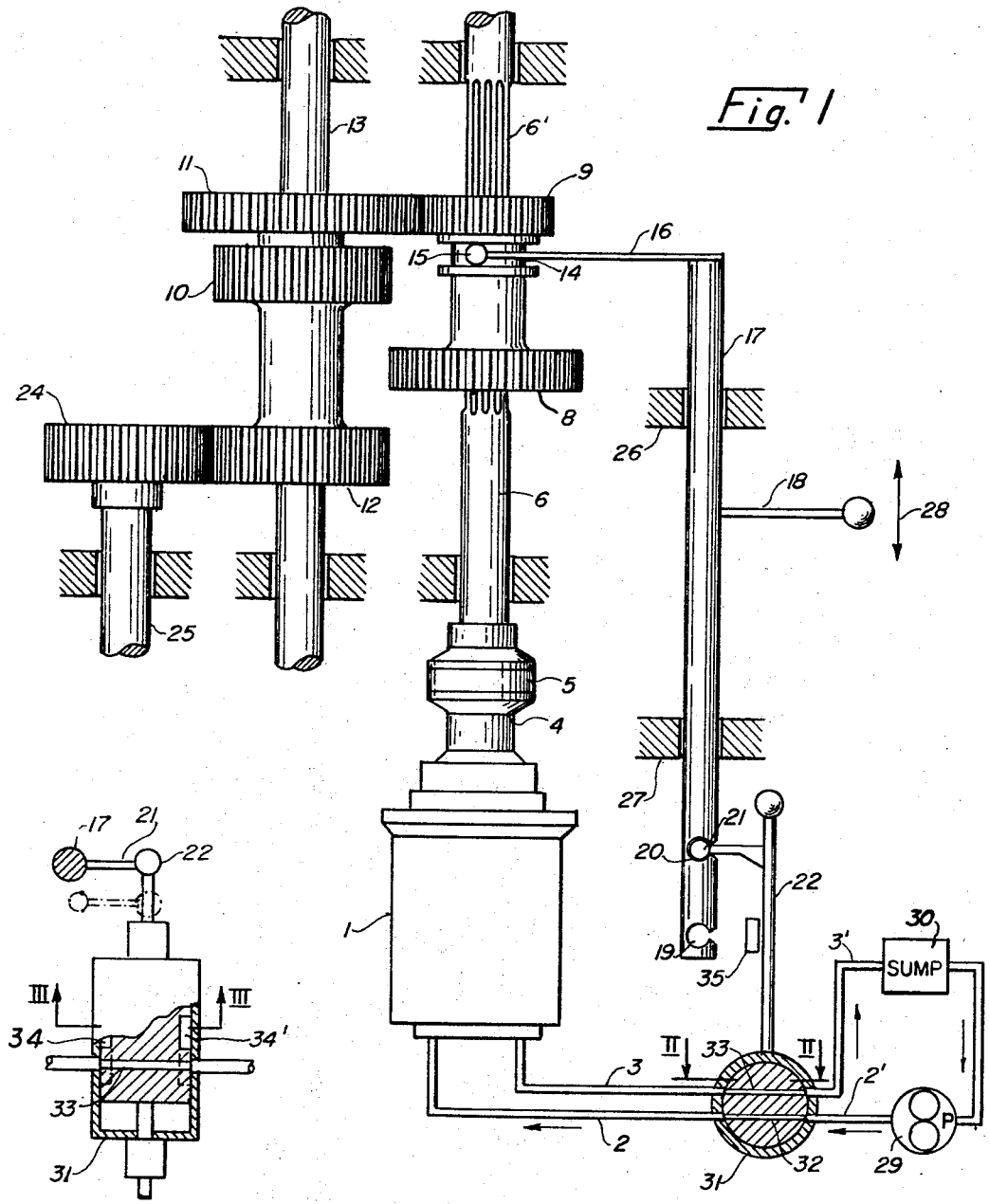
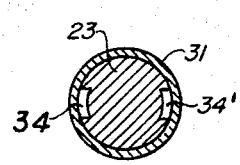

3,321,991
CONTROL MECHANISM FOR SHIFTABLE
TRANSMISSION SYSTEM
Erhart Kammer, Stockstadt am Main, Germany, assignor to Linde Aktiengesellschaft, a corporation of Germany
Filed July 7, 1964, Ser. No. 380,867
Claims priority, application Germany, July 27, 1963, G 38,334
7 Claims. (Cl. 74—472)

ABSTRACT OF THE DISCLOSURE

A gear-type transmission system for varying the torque applied to a load by a hydraulic-drive motor and including two gears relatively shiftable into and out of engagement by a control lever or arm, and a latch for arresting this control member in the engaged position of the gears and adapted hydraulically to de-energize the motor for the shifting operation. A valve is provided in the hydraulic supply line for the hydrostatic motor and includes a connecting member releasably engageable with the control member.

My present invention reates to a gear-type transmission system provided with a shifting mechanism for varying the torque applied to a load by a drive motor, more specifically a motor of the fluid-operated type.

In such transmission it may happen, particularly after some initial wearing of the gear teeth, that the intermeshing gears develop a force component tending to move them out of mutual engagement. This is not necessarily harmful when no major torque transfer takes place, i.e. when the drive gear is disconnected from power or when the driven gear is decoupled from its load; under normal operating conditions, however, serious damage to the gears may ensue at the instant when their teeth contact one another only over a restricted area insufficient to withstand the applied stress. It is then that chipping may occur and that the resulting fragments may lodge in other parts of the transmission, thereby leading to further breakage.

Although operating personnel may be instructed to shift gears only when the transmission is idling, and safety devices may even be provided to prevent spontaneous or inadvertent shifting, experience has shown that operators will sometimes ignore these instructions and neglect to utilize the safety devices. My invention, therefore, has as its general object the provision of foolproof means for insuring that no shifting of gears can take place while the transmission is under power.

This object is realized, in accordance with the present invention by the provision of latch means for the gearshift control so coupled with the power source of the associated drive motor as to de-energize that motor when moved into an inoperative position to permit relative shifting of the interlocking gears.

According to a more specific feature of my invention, applicable to hydrostatic drive motors in which the supply of hydraulic fluid is connected with the motor via a highpressure and a low-pressure conduit, I insert in at least one of these conduits a valve which permits normal circulation in the operative position of the latch means but interrupts this circulation when the latch means is retracted into its inoperative position. Advantageously, upon such retraction, the valve short-circuits the two conduits at least on the pump side so as not to overload the fluidsupply pump during de-energization of the motor; such a short circuit may, however, also be provided concurrently on the motor side, to facilitate rotation of the motor shaft, unless it is desired to block that shaft in the gear-shifting position.

The invention will be described in greater detail with reference to the accompanying drawing in which:

FIG. 1 is a somewhat diagrammatic illustration, partly in section, of a transmission system employing my invention;

FIG. 2 is a sectional detail view on the line II—II of FIG. 1; and

FIG. 3 is a cross-sectional view taken on the line III—III of FIG. 2.

The system of FIG. 1 comprises a hydrostatic or hydrodynamic motor 1 provided with a high-pressure supply conduit 2 and a low-pressure return conduit 3 for the circulation of a hydraulic fluid to drive a swash-plate or turbine rotor not shown. The rotor shaft 4 is connected through an elastic coupling 5 with a power shaft 6 having a splined portion 6' along which a sleeve 7 with two gears 8, 9 is axially slidable. An intermediate shaft 13 carries three axially fixed gears 10, 11 and 12, the gears 10 and 11 being arranged to mesh with gears 8 and 9, respectively, in different axial positions of sleeve 7 to provide different transmission ratios between the shafts 6 and 13. Gear 12 is in constant mesh with another gear 24 on an output shaft 25 on which there is mounted a machine tool or other load not shown.

The shifting of the movable gears 8, 9 is brought about with the aid of a fork 16 whose prongs 15 (only one shown) play in an annular groove 14 on sleeve 7. Fork 16 is rigid with a rod 17 which is slidable in bearings 26, 27 with the aid of a handle 18, as indicated by arrow 28. Rod 17 is provided with two axially spaced recesses 19 and 20 adapted for mating engagement with the extremity of a latch arm 21 on a lever 22.

The valve 23 is inserted in the two conduits 2 and 3 between motor 1 and a fluid source, here shown as a pump 29 and a reservoir or sump 30. The body of valve 23 is cradled in a cylinder 31 and has two transverse passages 32, 33 registering with conduits 2 and 3, respectively, and their supply-side extensions 2', 3' in the position shown in FIG. 1 in which the latch arm 21 is received in one of the two recesses of rod 17, here specifically the recess 20. Valve body 23 can be slid axially in cylinder 31, with the aid of lever 22, to disengage the latch 21 from its recess, the passages 32, 33 being simultaneously moved out of registry with conduits 2, 2' and 3, 3' so that the circulation of hydraulic fluid to motor 1 is interrupted. Another passage 34' (see FIGS. 2 and 3) in valve body 23 interconnects, upon such disalignment, the conduit sections 2' and 3' which extend from the valve 23 to the pump 29 and sump 30, respectively, to short-circuit the fluid path in the idling condition of motor 1. An abutment or guide element 35 may be provided to help maintain the lever 22 in this short-circuiting position upon its disengagement from rod 17; the disengaged lever may, however, also be swung out to block the conduits 2' and 3', e.g. upon a stopping of the preferably adjustable pump 29.

FIGS. 2 and 3 also show a peripheral passage 34, similar to passage 34', which interconnects the conduit sections 2 and 3 on the motor side in the short-circuiting position of lever 22. This bridging of conduits 2 and 3 is designed, particularly in the case of a hydrostatic motor, to prevent the abrupt stoppage of shaft 6 and to permit some further rotation of the shaft during shifting in order to facilitate the meshing of the gears to be interengaged. Naturally, the passage 34 may be omitted if such mobility of the shaft 6 is not required or if it is in fact desired that this shaft be blocked during the shifting of gears. It will also be understood that the passages 34 and 34', individually short-circuiting the conduits 2, 3 and 2', 3', may be interconnected or form part of a single peripheral recess of valve body 23.

It will be apparent that a shifting of rod 17 is possible only when the lever 22 has displaced the valve 23 to de-energize the motor 1 and that the fluid supply to the motor cannot be restored unless this rod is in a position in which either the gears 9 and 11 or the gears 8 and 10 are fully engaged. Thus, my system effectively prevents any spontaneous disengagement or intentional shifting of gears under power.

Some of the features herein disclosed are, of course, not limited to motors whose source of power is a hydraulic or pneumatic pressure fluid. Moreover, systems embodying the invention are useful not only in the operation of machine tools but also for the driving of automotive vehicles, particularly in heavy-duty agricultural tractors, harvesters and the like.

I claim:

1. A transmission system for communicating the torque of a fluid-operated drive motor to a load, comprising a source of operating fluid for said motor; first gear means coupled with said motor; second gear means coupled with said load and disposed for meshing engagement with said first gear means, said first and second gear means being relatively shiftable into and out of an engaged position; control means for relatively shifting said first and second gear means; and latch means for arresting said control means in an operative position corresponding to said engaged position of said first and second gear means, said latch means being provided with means for de-energizing said motor upon disengagement of said latch means from said control means to permit relative shifting of said first and second gear means from said engaged position.

2. A transmission system for communicating the torque of a fluid-operated drive motor to a load, comprising a source of operating fluid for said motor including a high-pressure supply conduit and a low-pressure return conduit; first gear means coupled with said motor; second gear means coupled with said load and disposed for meshing engagement with said first gear means, said first and second gear means being relatively shiftable into and out of an engaged position; control means for relatively shifting said first and second gear means; valve means in at least one of said conduits; and latch means for arresting said control means in an operative position corresponding to said engaged position of said first and second gear means, said latch means being coupled with said valve means for de-energizing said motor upon disengagement of said latch means from said control means to permit relative shifting of said first and second gear means from said engaged position.

3. A transmission system for communicating the torque of a fluid-operated drive motor to a load, comprising a source of operating fluid for said motor including a high-pressure supply conduit and a low-pressure return conduit; first gear means coupled with said motor; second gear means coupled with said load and disposed for meshing engagement with said first gear means, said first and second gear means being relatively shiftable into and out of an engaged position; control means for relatively shifting said first and second gear means; valve means in said conduits; and latch means for arresting said control means in an operative position corresponding to said engaged position of said first and second gear means, said latch means being coupled with said valve means for de-energizing said motor by short-circuiting said conduits upon disengagement of said latch means from said control means to permit relative shifting of said first and second gear means from said engaged position.

4. A transmission system for communicating the torque of a drive motor to a load, comprising a power source for said motor; first gear means coupled with said motor; second gear means coupled with said load and disposed for meshing engagement with said first gear means, said first and second gear means being relatively shiftable into a plurality of engaged positions with different transmission ratios; control means for relatively shifting said first and second gear means; and latch means for arresting said control means in any of several operative positions corresponding to said engaged positions of said first and second gear means, said latch means being provided with means for de-energizing said motor upon disengagement of said latch means from said control means to permit relative shifting of said first and second gear means.

5. A transmission system for communicating the torque of a fluid-operated drive motor to a load, comprising a source of operating fluid for said motor, first gear means coupled with said motor; second gear means coupled with said load and disposed for meshing engagement with said first gear means, said first and second gear means being relatively shiftable into a plurality of engaged positions with different transmission ratios; control means for relatively shifting said first and second gear means; and latch means for arresting said control means in any of several operative positions corresponding to said engaged positions of said first and second gear means, said latch means being provided with means for de-energizing said motor upon disengagement of said latch means from said control means to permit relative shifting of said first and second gear means.

6. A transmission system for communicating the torque of a fluid-operated drive motor to a load, comprising a source of operating fluid for said motor including a high-pressure supply conduit and a low-pressure return conduit; first gear means coupled with said motor; second gear means coupled with said load and disposed for meshing engagement with said gear means, said first and second gear means being relatively shiftable into a plurality of engaged positions with different transmission ratios; control means for relatively shifting said first and second gear means; valve means in at least one of said conduits; and latch means for arresting said control means in any of several operative positions corresponding to said engaged positions of said first and second gear means, said latch means being coupled with said valve means for de-energizing said motor upon disengagement of said latch means from said control means to permit relative shifting of said first and second gear means.

7. A transmission system for communicating the torque of a fluid-operated drive motor to a load, comprising a source of operating fluid for said motor including a high-pressure supply conduit and a low-pressure return conduit; first gear means coupled with said motor; second gear means coupled with said load and disposed for meshing engagement with said first gear means, said first and second gear means being relatively shiftable into a plurality of engaged positions with different transmission ratios, control means for relatively shifting said first and second gear means; valve means in said conduits; and latch means for arresting said control means in any of several operative positions corresponding to said engaged positions of said first and second gear means, said latch means being coupled with said valve means for de-energizing said motor by short-circuiting said conduits upon disengagement of said latch means from said control means to permit relative shifting of said first and second gear means.

References Cited

UNITED STATES PATENTS

| | | | |
|---|---|---|---|
| 1,527,247 | 2/1925 | Bouillon | 74—472 |
| 1,541,240 | 6/1925 | Barkeij | 74—472.2 |
| 2,307,676 | 1/1943 | Harlan | 74—733 |
| 3,126,763 | 3/1964 | Bowers. | |

DAVID J. WILLIAMOWSKY, *Primary Examiner.*

FRED C. MATTERN, *Examiner.*

L. H. GERIN, *Assistant Examiner.*